(12) United States Patent
Porto et al.

(10) Patent No.: US 11,932,081 B2
(45) Date of Patent: Mar. 19, 2024

(54) METHOD FOR CONTROLLING A SYSTEM FOR A MOTOR VEHICLE

(71) Applicant: Valeo Systemes Thermiques, Le Mesnil-Saint-Denis (FR)

(72) Inventors: Muriel Porto, Le Mesnil Saint Denis (FR); Thomas Guenet, Le Mesnil Saint Denis (FR); Jin-Ming Liu, Le Mesnil Saint Denis (FR); Wissem Nouainia, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 817 days.

(21) Appl. No.: 16/978,413

(22) PCT Filed: Mar. 5, 2019

(86) PCT No.: PCT/FR2019/050484
§ 371 (c)(1),
(2) Date: Sep. 4, 2020

(87) PCT Pub. No.: WO2019/170995
PCT Pub. Date: Sep. 12, 2019

(65) Prior Publication Data
US 2021/0039472 A1 Feb. 11, 2021

(30) Foreign Application Priority Data
Mar. 6, 2018 (FR) ...................... 1851923

(51) Int. Cl.
*B60H 1/00* (2006.01)
*B60R 16/023* (2006.01)

(52) U.S. Cl.
CPC ..... *B60H 1/00835* (2013.01); *B60H 1/00028* (2013.01); *B60H 1/00485* (2013.01);
(Continued)

(58) Field of Classification Search
CPC ............ B60H 1/00835; B60H 1/00028; B60H 1/00485; B60H 2001/00178;
(Continued)

(56) References Cited

U.S. PATENT DOCUMENTS

| 5,880,565 A | 3/1999 | Watanabe |
| 6,548,977 B2 * | 4/2003 | Vu ........................... G01D 3/08 388/901 |

(Continued)

FOREIGN PATENT DOCUMENTS

| CN | 103415685 A | * 11/2013 | ............ F02D 11/107 |
| EP | 0825708 A2 | 2/1998 | |
| JP | 2001275397 A | 10/2001 | |

OTHER PUBLICATIONS

International Phase Application and Written Opinion in corresponding International Application No. PCT/FR2019/050484, dated Jun. 14, 2019 (12 pages).

*Primary Examiner* — Michael J Zanelli
(74) *Attorney, Agent, or Firm* — Osha Bergman Watanabe & Burton LLP

(57) ABSTRACT

A method for controlling a system for a motor vehicle is disclosed. The system includes an actuator, a volatile memory (RAM) in which an item of position information of the actuator ($IP_{RAM}$) is stored, and a long-term memory (EPROM). The following are stored in the long-term memory (EPROM): at least one item of position information ($IP_{ROM}$) of the actuator and an item of information relating to the powering down of the actuator ($I_{HT}$), which assumes a first value (v1) when the system has been powered down in a controlled manner and assuming assumes a second value (v2) when the system has suffered a fault causing the current value of the position of the actuator stored in the volatile memory (RAM) to be deleted.

11 Claims, 1 Drawing Sheet

(52) U.S. Cl.
CPC .................. *B60R 16/0231* (2013.01); *B60H 2001/00178* (2013.01); *B60H 2001/00214* (2013.01)

(58) Field of Classification Search
CPC ...... B60H 2001/00214; B60R 16/0231; B60R 16/0232; H02P 1/16; H02P 8/30
See application file for complete search history.

(56) References Cited

U.S. PATENT DOCUMENTS

| | | | |
|---|---|---|---|
| 8,716,960 B2* | 5/2014 | Duits | H02K 11/21 310/49.18 |
| 2009/0090880 A1* | 4/2009 | Dolenti | F16K 31/12 290/1 A |
| 2016/0313037 A1 | 10/2016 | Takahashi | |
| 2018/0043748 A1 | 2/2018 | Kuribayashi | |

* cited by examiner

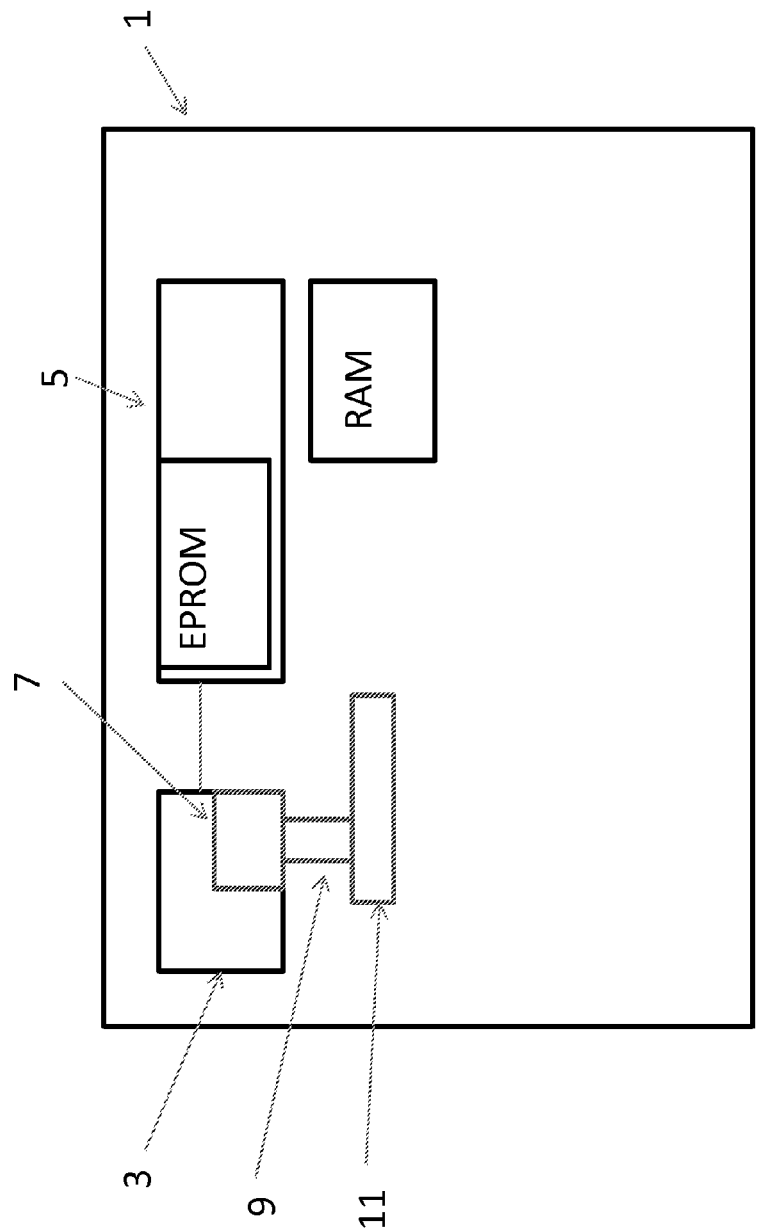

METHOD FOR CONTROLLING A SYSTEM FOR A MOTOR VEHICLE

BACKGROUND

The present invention relates to the field of actuators for a motor vehicle, and more particularly to the control of a system comprising at least one actuator.

Specifically, in the automotive field, mobile elements have to be moved into various positions in order to operate the system or systems in a particular operating mode.

These mobile elements are generally moved by way of one or more actuators. The actuator or actuators are generally electrical and make it possible to convert electrical energy into mechanical work, such as a rotational and/or translational movement.

More particularly, the mobile element may be a flap arranged in a heating, ventilation and/or air-conditioning (also known by the acronym HVAC) installation.

It will be noted that a heating, ventilation and/or air-conditioning installation for a motor vehicle is a module, generally arranged under the dashboard of the vehicle.

Said heating, ventilation and/or air-conditioning installation comprises:
- at least one external or internal air inlet;
- at least one air outlet opening into the passenger compartment of the vehicle;
- air ducts in which there are arranged one or more heat exchangers that will make it possible to thermally treat (that is to say heat or cool) an air flow passing through them (said air flow being intended to reach the passenger compartment of the vehicle via said at least one air outlet).

It is additionally necessary for the heating, ventilation and/or air-conditioning installation to be equipped with an air blower in order to generate an air flow large enough so that said air flow is able to pass through the heat exchanger or exchangers and reach the passenger compartment of the motor vehicle.

Moreover, one or more flaps are arranged in the air ducts of the installation in order to allow various operating modes thereof, for example an air-conditioning mode, heating mode, dehumidification mode, etc. The flap or flaps, depending on their position in the air duct, will make it possible for example to regulate the path of the air flow in the heat exchanger or exchangers.

What is known as a mixing flap may for example also be used to regulate the amount of hot air and cold air that mix before being distributed in the passenger compartment. Said mixing flap, depending on its position, thus makes it possible to more accurately regulate the temperature of the air distributed in the passenger compartment by said heating, ventilation and/or air-conditioning installation.

Mobile elements are also found in the expansion devices arranged in the air-conditioning loop of a motor vehicle. The air-conditioning loop generally comprises heat exchangers, a compressor and expansion devices. The elements of said loop are connected by ducts in which a refrigerant fluid flows.

The expansion device, and the other elements of the loop, each have different functions in order to subject the refrigerant fluid to a thermodynamic cycle, thereby making it possible for example to transfer calories from one location to another.

The expansion device or devices make it possible to subject the refrigerant fluid flowing through said expansion device, the expansion is generally considered to be isenthalpic. This means that the pressure of the refrigerant fluid is lowered without any variation (or with minimal variation) in the enthalpy of the refrigerant fluid.

The expansion device comprises for example an actuator, a fluid duct portion and a mobile piston.

The mobile piston is arranged at least partly in the fluid duct portion. In addition, the position of the piston in said duct portion defines the flow cross section of the refrigerant fluid able to flow in said portion.

The expansion experienced by the refrigerant fluid is variable on the basis of the flow cross section of the portion of the fluid duct. More particularly, the smaller the flow cross section, the greater the expansion.

The actuator is connected to said mobile piston and makes it possible to move same in order to vary the flow cross section of the refrigerant fluid in said fluid duct portion.

It is necessary to vary the expansion experienced by the refrigerant fluid flowing in the air-conditioning loop on the basis of the temperature and external pressure conditions and/or of the operating mode of the air-conditioning loop (heat pump mode, air-conditioning mode, dehumidification mode, etc.).

Moreover, said motor vehicle system comprising at least one actuator commands same, but for this purpose it is necessary for said system to know the value of the position of said actuator, and therefore by extension the position of said mobile member, in order to be able to send a correct movement instruction to the actuator. Said system generally comprises a volatile memory or a long-term memory that allows the system to store the value of the position of the actuator.

An incorrect value of the position of the actuator will result in incorrect movement instructions that will bring the mobile member into a position in which it does not perform the expected function. This therefore leads to degradation of the expected performance of the system of the motor vehicle.

In addition, if the mobile member is in an end position and the movement instruction causes it to move beyond the end position, the actuator will "force" the movement of the mobile member against the end stop, this resulting in premature wear of the components of the actuator (for example at the gear train).

Thus, if the value of the position of the actuator is considered to be incorrect or the position value has been lost (for example because the system was unexpectedly shut down), it is necessary to determine the position of the actuator before commanding the actuator again in order to move a mobile member.

To this end, it is possible to carry out what is known as a "self-calibration" operation on the actuator, that is to say that said actuator will receive a movement instruction that will bring the mobile member into an end position, but, as in the previous case, this may cause the mobile member to be forced against the end stop.

SUMMARY

The present invention thus aims to at least partially rectify the abovementioned drawbacks by proposing a method for controlling a system for a motor vehicle, said system comprising at least:
- an actuator, for example configured so as to move a mobile member,
- a volatile memory storing at least one item of actuator position information, a long-term memory storing:
    at least one item of actuator position information,
    information relating to the shutdown of the actuator, this information taking a first value when the system was shut down in a controlled manner and taking a second value when the system experienced a fault that caused the erasure of the current value of the position of the actuator stored in the volatile memory, in particular when the system inadvertently stopped being supplied with electric power or communication between the system and a computer was inadvertently disconnected,
said method comprising the following steps:
when the system is activated following shutdown, determining whether the position value stored in the long-term memory is considered to be correct on the basis of the shutdown information;
if the position value is considered to be correct, using this value to command the actuator;
if the position value is considered to be incorrect, determining a value of the position of the actuator, in particular before commanding the actuator again.

In the present case, it is considered that the position of the actuator corresponds to the position of the mobile member.

According to one possible feature, the method comprises the following steps:
    reading the shutdown information,
    if the shutdown information is equal to the first value, then considering the position value stored in the long-term memory to be correct,
    if the shutdown information is equal to the second value, then considering the position value stored in the long-term memory to be incorrect.

According to another possible feature, the method comprises the following steps:
    if the shutdown information is equal to the second value, then the position value stored in the long-term memory is considered to be incorrect, and an electronic entity sends a position value of the actuator to the system.

According to another possible feature, the electronic entity sends a position value of the actuator to the system that is calculated on the basis of a plurality of positions stored in the memory of the electronic entity.

According to another possible feature, if at least the last 5 positions stored in the memory of the electronic entity are identical, then the last stored position value is considered to be correct and is sent to the system as the position value of the actuator so that this value is stored in the volatile memory.

According to another possible feature, if the last 7 positions stored in the memory of the electronic entity are different, the electronic entity calculates the difference between the maximum stored position value and the minimum stored position value, specifically on a sample of at least the last 7 stored position values, and if this difference is less than 1% of the total number of steps of the actuator, then the last recorded position is considered to be correct.

According to another possible feature, if the last 7 positions stored in the memory of the electronic entity are different, the computer calculates the difference between the maximum stored position value and the minimum stored position value, specifically on a sample of at least the last 7 stored position values, and if this difference is between 1% and 3% of the total number of steps of the actuator, then the actuator performs simple self-calibration.

According to another possible feature, if the last 7 positions stored in the memory of the electronic entity are different, the computer calculates the difference between the maximum stored position value and the minimum stored position value, specifically on a sample of at least the last 7 stored position values, and if this difference is greater than 3% of the total number of steps of the actuator, then the actuator performs full self-calibration.

According to another possible feature, if the system is shut down in a controlled manner, then the value of the position of the actuator is stored in the long-term memory.

According to another possible feature, if the system is shut down in a controlled manner, then the value of the shutdown information takes a value equal to the first value.

According to another possible feature, the position value written to the volatile memory is equal to the last position value stored in the long-term memory, if the system was shut down in a controlled manner.

According to another possible feature, when the system is activated, the information value relating to the shutdown of the actuator, after said information is read, takes the second value when the system.

The invention also relates to a heating, ventilation and/or air-conditioning installation, designed to implement the above method.

BRIEF DESCRIPTION OF DRAWINGS

The invention will be better understood and other details, features and advantages of the invention will become more clearly apparent in light of the following description provided by way of illustrative and non-limiting example and with reference to the accompanying drawings, in which:

FIG. 1 shows a highly schematic view of the motor vehicle system comprising at least an actuator.

DETAILED DESCRIPTION

FIG. 1 shows a highly schematic view of a system 1 for a motor vehicle comprising at least:
    an actuator 3,
    a volatile RAM memory able to store at least one item of information, such as information relating to the position of the actuator 3; this information is generally a value of the position of the actuator 3;
    a long-term EPROM memory able to store at least one item of information, such as information relating to the position of the actuator 3; this information is generally a value of the position of the actuator 3.

The system 1 may also comprise a control module 5 that is connected firstly to a computer, such as the electronic control unit of the vehicle (not shown), and secondly to the actuator 3. The link between the control unit 5 and the actuator or with the computer is formed by way of a communication bus BUS, such as a LIN bus or a CAN bus.

In one embodiment that is not shown, the actuator 3 may also comprise the control unit 5; in this case, the actuator is said to be "intelligent".

It will be noted that the volatile RAM memory is located in the actuator 3, but that this volatile RAM memory could be located in the control unit or at any other location in the vehicle.

It will also be noted that the long-term EPROM memory is, for its part, located in the control unit 5, but that this long-term EPROM memory could be located in the actuator 3 or at any other location in the vehicle.

It will moreover be noted that:
- a volatile RAM memory is a memory that loses the stored information when its electric power supply is interrupted;
- a long-term EPROM memory is a memory that keeps the stored information even when its electric power supply is interrupted or disconnected; a long-term memory may also be denoted by the term non-volatile memory.

More particularly, the actuator 3 is a device able to convert electrical energy that has been supplied thereto into mechanical work. In the automotive field, an actuator generally comprises an electric motor 7, a gear train (not shown) and an output shaft 9 able to be connected (directly or indirectly) to a mobile member 11.

The electric motor 7 is connected to the output shaft 9 via the gear train. The electrical energy supplied to the electric motor is converted into mechanical work, generally a rotational (and/or translational) movement, via the output shaft 9. The gear train makes it possible for example to convert the movement of the motor in order to make it compatible with the desired movement of the mobile member 11 via the output shaft 9, and this also makes it possible to regulate the torque and rotational speed of the output shaft 9.

More particularly, the volatile RAM memory is configured so as to store at least one item of actuator position information $IP_{RAM}$.

On the other hand, the long-term EPROM memory is configured so as to store firstly at least one item of actuator position information $IP_{ROM}$ and secondly information relating to the shutdown $I_{HT}$ of the actuator 3.

The information relating to the shutdown $I_{HT}$ of the actuator 3 may take one of the following two values:
- a first value v1 when the system 1 was shut down in a controlled manner;
- a second value v2 when the system experienced a fault that caused the erasure of the current value of the position of the actuator stored in the volatile memory (RAM) (that is to say the information relating to the position of the actuator stored in the volatile memory), in particular when the system 1 inadvertently stopped being supplied with electric power or communication between the system 1 and a vehicle computer was inadvertently disconnected.

The system 1 is thus configured, after activation or reactivation of the system 1 following shutdown thereof, so as to read (E1) the position value $I_{ROM}$ stored in the long-term memory (EPROM) and to consider whether this value is correct or incorrect on the basis of the shutdown information $I_{HT}$. Specifically, when the system 1 is shut down in a controlled manner, then the value IP of the position of the actuator 3 is stored in the long-term EPROM memory.

In addition, the value of the shutdown information $I_{HT}$ takes a value equal to the first value v1.

Moreover, the position value $IP_{RAM}$ written to the volatile RAM memory is equal to the last position value stored in the long-term EPROM memory if the system was shut down in a controlled manner.

It will however be noted that the information relating to the shutdown of the actuator $I_{HT}$ takes the second value v2 as its value after said information is read.

Thus, in this case, the actuator position value $IP_{ROM}$ stored in the long-term EPROM memory is considered to be correct. The system 1 then uses this value to command the movement of the actuator 3.

More particularly, the actuator position value $IP_{ROM}$ stored in the long-term EPROM memory is written to the volatile RAM memory. The system 1 then controls the movement of the actuator 3 on the basis of the actuator position value $IP_{RAM}$ stored in the volatile RAM memory.

Depending on the movements of the actuator 3, the position value $IP_{RAM}$ of said actuator stored in the volatile memory is updated (either by the actuator 3 or by the control unit 5).

However, if the shutdown information $I_{HT}$ is equal to the second value v2, the position value stored in the long-term EPROM memory is considered to be incorrect. Specifically, in this case, it may be assumed that the value $IP_{ROM}$ of the position of the actuator stored in the long-term memory is not correct, since the system 1 was not able to be shut down in a controlled manner and therefore was not able to record the correct value $IP_{ROM}$ of the position of the actuator in the long-term EPROM memory, specifically based on the value $IP_{RAM}$ of the position of the actuator stored in the volatile RAM memory, the latter value corresponding to the actual position of the actuator 3, this value being updated on the basis of the movements made by said actuator.

It is therefore necessary to determine the position of the actuator 3 before commanding it again.

In this case, it is a computer of the vehicle that determines the value of the shutdown information $I_{HT}$, but it may be any electronic entity that is configured so as to perform this role.

The computer of the vehicle may for example send a position value IP of the actuator 3 when the information relating to the position of the actuator 3 is considered to be incorrect.

To this end, the computer calculates a probable position value ($v_{cal}$) of the actuator (3) on the basis of a plurality of positions stored in the memory of the computer of the vehicle.

More particularly, if at least the last five positions stored in the computer memory are identical, then the last stored position value is considered to be correct and is sent to the system (1) as the position value of the actuator (3) so that this value is stored in, that is to say written to, the volatile memory (RAM). The system 1, and the actuator 3, then takes this position value of the actuator 3 written to the volatile RAM memory as a basis in order to control the movement of the actuator 3 accordingly.

However, if the last 7 positions stored in the memory of the computer are different, then the computer calculates the difference between the maximum stored position value and the minimum stored position value, specifically on a sample corresponding to at least seven of the last stored position values, and if this difference is less than 1% of the total number of steps of the actuator, then the last recorded position is considered to be correct. The computer thus communicates this position value to the system 1 so that it is written to the volatile RAM memory and that the system 1 then takes this written position value as a basis in order to control the movement of the actuator 3 accordingly.

However, if this difference is between 1% and 3% of the total number of steps of the actuator 3, then the actuator 3 performs simple self-calibration. The simple self-calibration consists in moving the actuator by a number of steps equal to at most half the total number of steps of the actuator, in the direction in which the mobile member is closest to an end stop. It is thus possible to return the mobile member to a known position while limiting the activation of the actuator while the mobile member is in an end position. This thus limits the wear of the gear train of the actuator.

The other possibility is that, if the difference between the maximum stored position value and the minimum stored position value, specifically on a sample of at least seven of the last position values stored in the memory of the computer, is greater than 3% of the total number of steps of the actuator, then the actuator 3 performs full self-calibration. Full self-calibration consists in moving the actuator by a number of steps equal to the total number of steps of the actuator (specifically for any direction of movement of the mobile member). For a difference greater than 3%, the value $IP_{ROM}$ of the position of the actuator stored in the long-term EPROM memory cannot be considered to be a representative or correct value of the actual position of the actuator and by extension of the position of the mobile member.

Thus, once self-calibration has been performed, the value IP of the position of the actuator 3 is recorded in the volatile RAM memory. This value stored in the volatile RAM memory then allows the system to move the actuator 3 in an appropriate manner.

When the system 1 is activated, the control method is triggered and comprises one or more of the following steps:
  reading the information relating to the shutdown of the actuator $I_{HT}$;
  and then setting the value of the information relating to the shutdown of the actuator $I_{HT}$ equal to the second value v2;
  if the information relating to the shutdown of the actuator $I_{HT}$ is equal to the first value v1;
    using the value of the position of the actuator stored in the long-term memory ROM (because it is correct), that is to say,
      writing the value of the position stored in the ROM memory to the RAM memory;
      sending a move command to the actuator based on the position value stored in the ROM memory;
  if the information relating to the shutdown of the actuator $I_{HT}$ is equal to the second value v2.

According to one exemplary implementation of the invention, the system is designed to generate information relating to the correct transition of the system to sleep mode, which is in particular able to take a first correct value in particular in the EPROM, in particular after writing the position value from the RAM to the EPROM.

Thus, as soon as the expansion device is reactivated, the information relating to the transition to sleep mode takes the second value, which is this time incorrect.

In particular, after a fault, at the time of reactivation, the computer checks the transition to sleep mode information.

If a shutdown following a fault is detected, then a position value of the actuator is determined.

The invention claimed is:

1. A method for controlling a system for a motor vehicle, said system comprising:
  an actuator,
  a volatile memory (RAM) storing at least one item of actuator position information,
  a long-term memory (EPROM) storing:
    at least one item of actuator position information,
    information relating to a shutdown of the actuator, the information taking a first value when the system was shut down in a controlled manner and taking a second value when the system experienced a fault that caused the erasure of the current value of the position of the actuator stored in the volatile memory (RAM), when the system inadvertently stopped being supplied with electric power or communication between the system and a computer was disconnected,
  said method comprising:
    when the system is activated following shutdown, determining whether the position value stored in the long-term memory (EPROM) is considered to be correct on the basis of the shutdown information;
    when the position value is considered to be correct, using this value to command the actuator;
    when the position value is considered to be incorrect, determining a value of the position of the actuator before commanding the actuator again; and
    when the shutdown information is equal to the second value, then the position value stored in the long-term memory (EPROM) is considered to be incorrect, and the computer sends a position value of the actuator to the system.

2. The method as claimed in claim 1, further comprising:
  reading the shutdown information,
  when the shutdown information is equal to the first value, then considering the position value stored in the long-term memory (EPROM) to be correct,
  when the shutdown information is equal to the second value, then considering the position value stored in the long-term memory (EPROM) to be incorrect.

3. The method as claimed in claim 1, wherein the computer sends a position value of the actuator to the system that is calculated on the basis of a plurality of positions stored in a computer memory of the computer.

4. The method as claimed in claim 3, wherein when at least the last 5 positions stored in the computer memory are identical, then the last stored position value is considered to be correct and is sent to the system as the position value of the actuator so that this value is stored in the volatile memory (RAM).

5. The method as claimed in claim 3, wherein when the last 7 positions stored in the computer memory are different, the computer calculates the difference between the maximum stored position value and the minimum stored position value, on a sample of at least the last 7 stored position values, and when this difference is less than 1% of the total number of steps of the actuator, then the last recorded position is considered to be correct.

6. The method as claimed in claim 3, wherein when the last 7 positions stored in the computer memory are different, the computer calculates the difference between the maximum stored position value and the minimum stored position value, specifically on a sample of at least the last 7 stored position values, and when this difference is between 1% and 3% of the total number of steps of the actuator, then the actuator performs simple self-calibration.

7. The method as claimed in claim 3, wherein when the last 7 positions stored in the computer memory are different, the computer calculates the difference between the maximum stored position value and the minimum stored position value, on a sample of at least the last 7 stored position values, and when this difference is greater than 3% of the total number of steps of the actuator, then the actuator performs full self-calibration.

8. The method as claimed in claim 1, wherein when the system is shut down in a controlled manner, then the value of the position of the actuator is stored in the long-term memory.

9. The method as claimed in claim 1, wherein when the system is shut down in a controlled manner, then the value of the shutdown information takes a value equal to the first value.

10. The method as claimed in claim 1, wherein the position value written to the volatile memory is equal to the last position value stored in the long-term memory, when the system was shut down in a controlled manner.

11. The method as claimed in claim 1, wherein when the system is activated, the information value relating to the shutdown of the actuator takes the second value.

* * * * *